United States Patent [19]

Miyagawa

[11] Patent Number: 5,520,491
[45] Date of Patent: May 28, 1996

[54] DRILL SCREW

[75] Inventor: Tsutomu Miyagawa, Osaka-fu, Japan

[73] Assignee: Miyagawa Kinzoku Kogyo Co., Ltd., Osaka-fu, Japan

[21] Appl. No.: 283,939

[22] Filed: Aug. 1, 1994

[30] Foreign Application Priority Data

May 11, 1994 [JP] Japan .................. 6-097180

[51] Int. Cl.$^6$ .................................. F16B 25/00
[52] U.S. Cl. .......................... 411/387; 411/386
[58] Field of Search ................... 411/386, 387; 408/223, 224, 225, 230

[56] References Cited

U.S. PATENT DOCUMENTS

| | | | |
|---|---|---|---|
| 4,068,554 | 1/1978 | Hirabayashi | 411/386 |
| 4,878,788 | 11/1989 | Wakihira et al. | 408/230 |
| 5,120,172 | 6/1992 | Wakai | 411/387 |
| 5,294,227 | 3/1994 | Forster et al. | 411/386 |

FOREIGN PATENT DOCUMENTS

| | | | |
|---|---|---|---|
| 525013 | 4/1992 | Japan . | |
| 4134913 | 12/1992 | Japan . | |
| 1073499 | 2/1984 | U.S.S.R. | 411/386 |
| 1316157 | 5/1973 | United Kingdom | 411/387 |

*Primary Examiner*—Steven N. Meyers
*Assistant Examiner*—Tuyet-Phuong Pham
*Attorney, Agent, or Firm*—Griffin, Butler, Whisenhunt & Kurtossy

[57] ABSTRACT

A drill screw of the type suitable for fastening a sheet or plate to a lightweight steel frame member comprises a head portion, a threaded portion adjacent the head portion, a drill shaft portion adjacent the threaded portion, a large diameter drill portion adjacent the drill shaft portion, and a small diameter drill portion adjacent the large diameter drill portion. The small diameter drill portion has a smaller drill angle than the large diameter drill portion thus providing improved bite so that less thrusting force is required and the tendency to skid and drift is reduced.

3 Claims, 1 Drawing Sheet

DRILL SCREW

FIELD OF THE INVENTION

The present invention relates to a fastening device and more particularly to a drill screw of a type suitable for fastening a sheet or plate to a lightweight steel frame member. The drill screw drills and threads a hole as it pierces the plate and frame member.

BACKGROUND OF THE INVENTION

Japanese Laid-open Utility Model 4-134913 discloses a drill screw comprising a head portion, a threaded portion adjacent the head portion, a drill shaft portion adjacent the threaded portion, a large diameter drill portion adjacent the drill shaft portion, a small diameter drill shaft portion adjacent the large diameter drill portion and having a smaller diameter than the drill shaft portion, and a small diameter drill portion adjacent the small diameter drill shaft portion. However, the drill angle of the small diameter drill portion is larger than the drill angle of the large diameter drill portion so that the bite of the screw on the plate is poor. Skidding and drift are likely to occur as drilling is initiated thus making it difficult to drill an accurately placed hole. Furthermore, since the small diameter drill shaft portion is located between the large and small diameter drill portions, a longer stroke is required to obtain penetration, the work load is larger, and hence the working efficiency is poor.

Japanese Laid-open Utility Model 5-25013 discloses a drill screw comprising a head portion, a threaded portion adjacent the head portion, a drill shaft portion adjacent the threaded portion, a large diameter drill portion adjacent the drill shaft portion, and a small diameter drill portion adjacent the large diameter drill portion. The drill angle of the small diameter drill portion in this device is also larger than the drill angle of the large diameter drill portion so that it too exhibits a poor tendency to bite into the plate and is subject to skid and drift.

Because of their poor biting characteristic and tendency to skid and drift, a worker must apply a large thrusting force thus making both of the prior art devices extremely difficult to use when the fastening is to be made at a location higher than the head of the worker.

SUMMARY OF THE INVENTION

An object of the present invention is to provide a drill screw which exhibits a better biting characteristic than drill screws of the prior art thus requiring less thrusting force to cause it to penetrate into a plate.

A further object of the invention is to provide a drill screw which, compared to prior art drill screws, is less likely to skid or drift.

An object of the present invention is to provide a drill screw comprising a head portion, a threaded portion adjacent the head portion, a drill shaft portion adjacent the threaded portion, a large diameter drill portion adjacent the drill shaft portion, and a small diameter drill portion adjacent the large diameter drill portion, the drill screw being characterized in that the small diameter drill portion has a smaller drill angle than the drill angle of the large diameter drill portion.

A further object of the invention is to provide a drill screw as described above wherein the drill angle of the large diameter drill portion is at least 100 degrees and the drill angle of the small diameter drill portion is less than 100 degrees.

Yet another object of the invention is to provide a drill screw as described above wherein the small diameter drill portion has a length which is 90% or less of the total length of the large diameter drill portion and the small diameter drill portion.

Other objects of the invention and the manner of making and using it will become obvious upon consideration of the following description and the accompanying drawings.

DETAILED DESCRIPTION OF THE INVENTION

Figure 2:
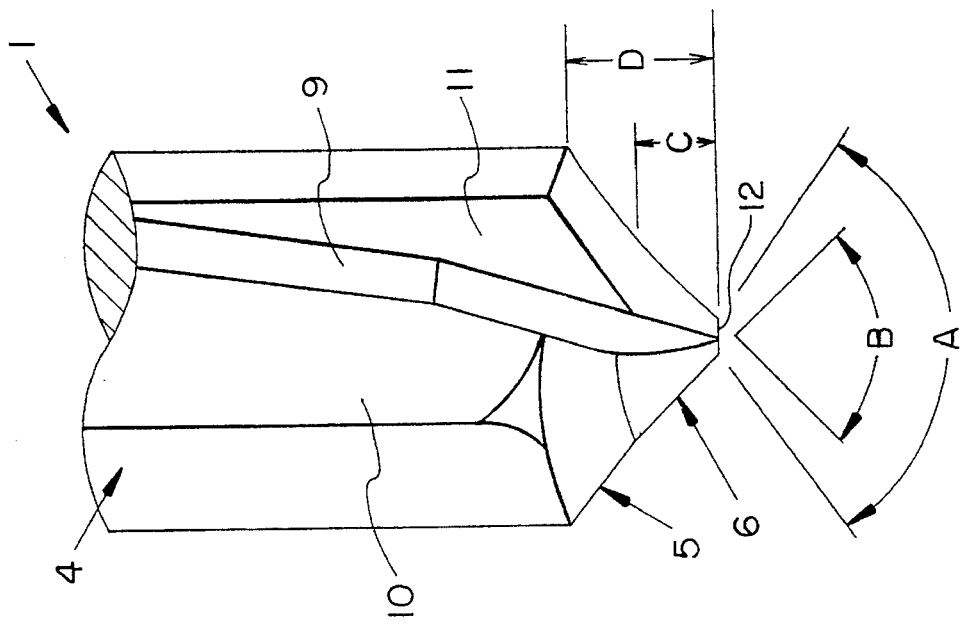
Figure 1:
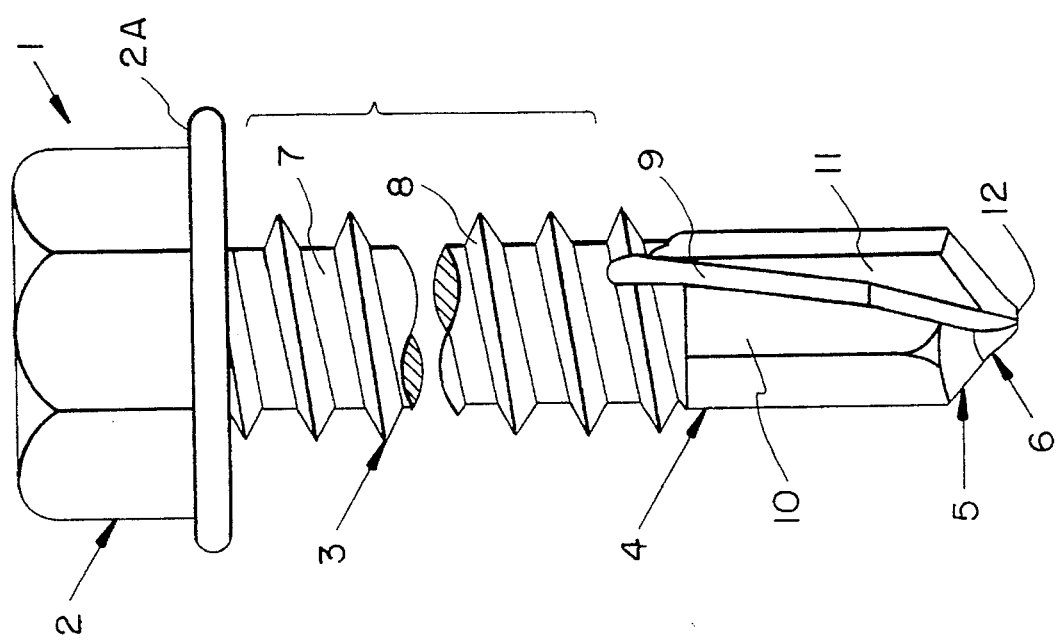
FIG. 1 is a front elevational view of a drill screw according to the present invention; and, FIG. 2 is an enlarged view of the drill portion of the drill screw shown in FIG. 1.

As illustrated in FIGS. 1 and 2, a drill screw 1 constructed in accordance with the principles of the present invention comprises a head portion 2, a threaded portion 3 adjacent the head portion 2, a drill shaft portion 4 adjacent the threaded portion 3, a large diameter drill portion 5 adjacent the drill shaft portion 4, and a small diameter drill portion 6 adjacent the large diameter drill portion 5.

The drill screw 1 is formed in a conventional manner of a suitable metal. The head portion 2 is preferably formed as a hexagon so that it may be engaged by a suitable driving tool. A flange 2A may be provided on the head portion 2.

The threaded portion 3 comprises a cylindrical shaft 7 coaxial with head portion 2, the shaft 7 having a screw thread 8 on its outer periphery.

The drill shaft portion 4 is nearly columnar and has an outside diameter approximately equal to the diameter of cylindrical shaft 7.

The large diameter drill portion 5 is coaxial with shaft 7 and is shaped as a circular truncated cone with the outside diameter gradually decreasing in the direction away from head portion 2. The maximum diameter of drill portion 5 is substantially equal to the diameter of drill shaft portion 4. The drill angle A of the large diameter drill portion 5 is preferably 100 degrees or more and may be in the range of 105 to 120 degrees.

The small diameter drill portion 6 is also coaxial with shaft 7 and is also shaped as a circular truncated cone with the outside diameter gradually decreasing in the direction away from head portion 2. The maximum diameter of the small diameter drill portion 6 is substantially equal to the minimum diameter of the large diameter drill portion 5. The drill angle B of the small diameter drill portion 6 is preferably less than 100 degrees and may be in the range of 85 to 95 degrees. The axial length C of the small diameter drill portion 6 is preferably less than about 90% of the total length D of the large diameter drill portion 5 and the small diameter drill portion 6. C may be in the range of 30 to 90 percent of the length D.

The drill angles A and B and the ratio of the length C to the length D are selected taking into consideration such factors as the thickness of the plate to be fastened. In a typical embodiment, A=110 degrees, B=90 degrees, and C is 55% of the length D.

A continuous carved portion or groove 9 is provided in the outer land surfaces 10 on opposite sides of the drill shaft portion 4, the large diameter drill portion 5, and the small diameter drill portion 6. A blade or cutting element 11 is provided at the backward edge of groove 9. That is, blade 11 is positioned at the edge of groove 9 so as to trail the groove as the drill screw is rotationally driven into a plate. The blades 11 are shaped to form a chisel point 12 at the forward end of the screw, that is, at the end where the small diameter drill portion 6 is located.

To drive the drill screw 1 into a plate, a driving tool (not shown) is engaged with the hexagonal head portion 2 to rotationally drive the screw and the operator applies an axial force against the tool in the direction of the arrow shown in FIG. 1 so that the screw is forced against the surface of the plate at the point where fastening is to take place. Initially, a hole of small diameter is drilled in the plate by the small diameter drill portion 6. Since the small diameter drill portion 6 has a small diameter, the initial cutting or digging resistance is small. Furthermore, since the drill angle B of the small drill portion 6 is smaller than the drill angle A of the large diameter drill portion 5, the screw bites more readily into the surface of the plate and skid and drift are less likely to occur.

Next, the hole of small diameter is enlarged by the large diameter drill portion 5 and the drill shaft portion 4 as these portions of the screw enter the hole. Since the large diameter drill portion 5 is only required to shave off the periphery of the initial hole, the resistance encountered by portion 5 is also small so that the entire hole may be formed with a small thrusting force.

Upon further movement of the screw into the enlarged hole, thread grooves are formed in the plate by the threaded portion 3. The drill screw 1 is then driven rotationally until the head portion 2 is tightened against the surface of the plate.

From the foregoing description it is seen that the present invention provides a drill screw which is easily installed, even when being installed above the head of a worker, because it requires less thrusting force than prior art drive screws. This reduction in the required thrusting force is attributable to the fact that the drill angle B of the small diameter drill portion 6 is made smaller than the drill angle A of the large diameter drill portion 5 so that the areas of both drill portion 5 and 6 contacting the plate being fastened is small.

While a preferred embodiment of the invention has been described in specific detail by way of illustration, it will be understood that various modifications and substitutions may be made in the described embodiment without departing from the spirit and scope of the invention as defined by the appended claims. For example, head portion 2 need not be hexagonal in shape and need not have a flange.

I claim:

1. A drill screw comprising:

a head portion;

a threaded portion adjacent the head portion;

a drill shaft portion adjacent the threaded portion;

a large diameter drill portion adjacent the drill shaft portion having the shape of a truncated cone; and, a small diameter drill portion adjacent the large diameter drill portion also having the shape of a truncated cone;

wherein a continuous carved groove is in an outer surface of the drill shaft portion, the large diameter drill portion and the small diameter drill portion on opposite sides of the drill shaft portion, with a backward edge of said groove forming a cutting element;

wherein the cone drill angle of the large diameter drill portion is 105 to 120 degrees and the cone drill angle of the small diameter drill portion is in the range of 85 to 95 degrees.

2. A drill screw as claimed in claim 1 wherein the small diameter drill portion has a length which is 90% or less of the total length of the large diameter drill portion and the small diameter drill portion.

3. A drill screw as claimed in claim 1 wherein the axial length of said smaller diameter drill portion is about 55% of the total axial length of said smaller diameter drill portion and said larger diameter drill portion.

* * * * *